United States Patent
Rondeau et al.

(10) Patent No.: US 10,936,396 B2
(45) Date of Patent: Mar. 2, 2021

(54) SYSTEMS AND METHODS FOR VALIDATION OF TEST RESULTS IN NETWORK TESTING

(71) Applicant: EXFO Inc., Québec (CA)

(72) Inventors: Marc Rondeau, Québec (CA); Michael Proctor, Montreal (CA)

(73) Assignee: EXFO Inc., Québec (CA)

( * ) Notice: Subject to any disclaimer, the term of this patent is extended or adjusted under 35 U.S.C. 154(b) by 167 days.

(21) Appl. No.: 16/284,585

(22) Filed: Feb. 25, 2019

(65) Prior Publication Data
US 2019/0384664 A1 Dec. 19, 2019

Related U.S. Application Data (60) Provisional application No. 62/685,259, filed on Jun. 14, 2018.

(51) Int. Cl.
*G06F 11/00* (2006.01)
*G06F 11/07* (2006.01)
*G06F 11/22* (2006.01)

(52) U.S. Cl.
CPC ...... *G06F 11/0766* (2013.01); *G06F 11/0709* (2013.01); *G06F 11/0793* (2013.01); *G06F 11/2273* (2013.01)

(58) Field of Classification Search
CPC .................................................. G06F 11/2733
See application file for complete search history.

(56) References Cited

U.S. PATENT DOCUMENTS

| | | | |
|---|---|---|---|
| 6,269,457 B1* | 7/2001 | Lane | G06F 11/2273 |
| | | | 714/38.1 |
| 7,362,862 B2 | 4/2008 | Schneier et al. | |
| 8,280,776 B2 | 10/2012 | Coulter et al. | |
| 9,155,959 B2 | 10/2015 | Riera Jorba et al. | |
| 2007/0136814 A1 | 6/2007 | Lee et al. | |
| 2009/0292821 A1* | 11/2009 | Grib | H04L 43/50 |
| | | | 709/238 |

(Continued)

FOREIGN PATENT DOCUMENTS

CN 106686134 A 5/2017

OTHER PUBLICATIONS

*Intellectual Ventures I LLC v. Erie Indemnity Co.* (Year: 2017).*

(Continued)

*Primary Examiner* — Jonathan D Gibson
(74) *Attorney, Agent, or Firm* — Clements Bernard Walker; Lawrence A. Baratta, Jr.

(57) ABSTRACT

A network testing system includes one or more test devices each including a media-specific testing module and a processing device with a network interface, wherein the processing device is configured to test a network with the media-specific testing module; one or more servers configured to receive test results from the test of the network either directly from the one or more test devices or an intermediate data source communicatively coupled to the one or more test devices; and a validator module executed on the one or more servers configured to perform automated post-processing on the test results to compare the test results to a pre-defined Method of Procedure (MOP), to auto-correct one or more errors in the test results, and to provide a report based on the comparison.

20 Claims, 9 Drawing Sheets

(56) References Cited

U.S. PATENT DOCUMENTS

| | | | |
|---|---|---|---|
| 2011/0209197 A1 | 8/2011 | Sardanopoli | |
| 2011/0211827 A1 | 9/2011 | Soto et al. | |
| 2012/0078566 A1* | 3/2012 | Gintis | H04L 41/0866 |
| | | | 702/119 |
| 2013/0054170 A1* | 2/2013 | Sobajic | G01R 31/3193 |
| | | | 702/82 |
| 2013/0215417 A1 | 8/2013 | Diestelmans et al. | |
| 2016/0356670 A1 | 12/2016 | Brillhart et al. | |
| 2017/0104645 A1 | 4/2017 | Wooton et al. | |
| 2017/0111258 A1 | 4/2017 | Bezold et al. | |
| 2017/0141966 A1 | 5/2017 | Fidel et al. | |
| 2017/0149634 A1 | 5/2017 | Bezold et al. | |
| 2017/0180372 A1 | 6/2017 | Bezold et al. | |
| 2017/0237800 A1 | 8/2017 | Carruthers | |
| 2017/0346706 A1* | 11/2017 | Sanders | H04L 41/5054 |
| 2019/0384664 A1* | 12/2019 | Rondeau | G06F 11/0793 |

OTHER PUBLICATIONS

Brown, Using the Method of Procedure (MOP) for Effective Network Change Control, Techopedia (Year: 2016).*

EXFO Inc., EXFO Connect Contractor Mode, Contractor Workforce Automation for Service Providers,13/05, 2 pages, 20130337V1, SAP1065276.

EXFO, 2019, May 10, 2019, https://www.exfo.com/en/products/field-network-testing/test-reporting-automation/exfo-connect/.

* cited by examiner

Validator Error Report

Template Name: Demo OTDR validation-1

| Item with Issue | Type | Failed Topic | Parameters | Current Value | Expected Value |
|---|---|---|---|---|---|
| CHE35_007_CTR_26 | OTDR | Identification | Customer | Empty | Service Provider X |
| CHE35_007_CTR_26 | OTDR | Identification | Operator B | Empty | Jimmy |
| CHE35_007_CTR_26 | OTDR | Identification | Comments | ARO_CHE35 | ARO_CHE35_7 |
| CHE35_007_CTR_27 | OTDR | Identification | Customer | Empty | Service Provider X |
| CHE35_007_CTR_27 | OTDR | Identification | Operator B | Empty | Jimmy |
| CHE35_007_CTR_27 | OTDR | Identification | Comments | ARO_CHE35 | ARO_CHE35_7 |
| CHE35_007_CTR_31 | OTDR | Identification | Comments | Empty | ARO_CHE35_7 |
| CHE35_007_CTR_70 | OTDR | Identification | Job ID | Empty | Job 123 |
| CHE35_007_CTR_99 | OTDR | Identifiers | Fiber ID | 100 | 1 to 99 |
| Project | OTDR | Identifiers | Number of Measurements | 95 | 99 |
| Project | OTDR | Identifiers | Missing Measurement | --- | 99 |
| Project | OTDR | Identifiers | Missing Measurement | --- | 44 |
| Project | OTDR | Identifiers | Missing Measurement | --- | 33 |
| Project | OTDR | Identifiers | Missing Measurement | --- | 22 |
| Project | OTDR | Identifiers | Missing Measurement | --- | 15 |
| CHE35_007_CTR_26 | OTDR | P/F Event Thresholds Verdict | Event #7, connector loss (1550nm) | 0.833dB | ≤ 0.700dB |
| CHE35_007_CTR_27 | OTDR | P/F Event Thresholds Verdict | Event #7, connector loss (1550nm) | 1.124dB | ≤ 0.700dB |
| CHE35_007_CTR_65 | OTDR | P/F Event Thresholds Verdict | Event #1, connector reflectance | -44.0dB | ≤ 45.0dB |
| CHE35_007_CTR_87 | OTDR | P/F Event Thresholds Verdict | Event #4, splice loss (1550nm) | 0.422dB | ≤ 0.400dB |
| CHE35_007_CTR_88 | OTDR | P/F Event Thresholds Verdict | Event #5, connector reflectance | -42.9dB | ≤ 45.0dB |
| CHE35_007_CTR_89 | OTDR | P/F Event Thresholds Verdict | Event #6, connector reflectance | -40.3dB | ≤ 45.0dB |
| CHE35_007_CTR_87 | OTDR | Test Parameters | Receive fiber length (1550nm) | 0.000km | 1.9642km to 2.0642km |

Number of errors: 22

502 — General Identification

| General Identification | |
|---|---|
| File name | CHE35_007.x |
| Test date | 2019-02-26 |
| Test time | 12:02:16pm |
| Job ID | Job compliance 1 |
| Customer | Service Provider |
| Company | TechC |
| Operator A | Marc |
| Operator B | Jimmy |

504 — Identifiers

| Identifiers | |
|---|---|
| Cable ID | CTR_33_01 |
| Fiber ID | 1; 2; 3; 4; 5 |
| Location A | NRO |
| Location B | DH |

506

| Location A | |
|---|---|
| Unit Model | FTB-720-12CD-23B |
| Unit Serial No | 123456 |
| Calibration | 2018-12-01 |

| Location B | |
|---|---|
| Unit Model | |
| Unit Serial No | |
| Calibration | |

508 — Results

| Identification | Summary | Thresholds | Event Table | Marker |

OTDR

Wavelength: 1550

Thresholds for 1550 nm

| Description | Apply | Fail | Warning |
|---|---|---|---|
| Unidir. splice loss | ☑ | 0.400dB | 0.400dB |
| Bidir. splice loss | ☐ | --- | --- |
| Unidir. connector loss | ☑ | 0.700dB | --- |
| Bidir. splice loss | ☐ | --- | --- |
| Reflectance | ☑ | -45dB | --- |
| Fiber section attenuation | ☐ | 0.000dB/km | --- |
| Span loss | ☐ | 20.000dB | --- |
| Span length | ☐ | 0.0000km | --- |
| Span ORL | ☐ | 15dB | --- |

510 — Test Settings

| Test Settings | |
|---|---|
| IOR | 1.467000 |
| Backscatter | -81.00dB |
| Helix factor | 0.00% |
| Splice loss detection threshold | 0.010dB |
| Reflectance detection threshold | -55.0dB |
| End-of-fiber detection threshold | 5.000dB |
| Fiber core size | 9 μm |

FIG. 10

SYSTEMS AND METHODS FOR VALIDATION OF TEST RESULTS IN NETWORK TESTING

CROSS-REFERENCE TO RELATED APPLICATION(S)

The present disclosure claims priority to U.S. Provisional Patent Application No. 62/685,259, filed Jun. 14, 2018, and entitled "Systems and methods for validation of test results in network testing," the contents of which are incorporated herein by reference.

FIELD OF THE DISCLOSURE

The present disclosure generally relates to network testing. More particularly, the present disclosure relates to systems and methods for validation of test results in network testing of a network.

BACKGROUND OF THE DISCLOSURE

Communication network operators often subcontract the testing of their network. In order to receive good and consistent test measurements from their employee and/or sub-contractor, the operators typically prepare a "method of procedure" (MOP) document which specifies the tests and tests conditions under which the communication network should be characterized. The method of procedure specifies how the test measurements should be documented (e.g., job ID, file naming, etc.), thresholds that should be applied on the different values being measured, the format of the test and measurement report used to submit the results for acceptance, location, start/completion times/days, test set calibration, etc. Once test personnel has completed testing as per the MOP of his customer, the test results are submitted to the customer (e.g., the network operator) with all the information requested in the MOP, i.e., raw test data, test report and/or any additional piece of information that may be required.

On the other side, customers may audit the test results received from the contractors manually using several parameters/aspects in order to accept or reject the test results. Of note, this is a manual process where human error can occur, and bad results can mistakenly be accepted as good results. Once the results are audited, there exists no process to see that a specific test results file has been validated as per a specific MOP, for a specific customer. Manually, this is a time-consuming process for the person performing the test acceptance. Also, it may not be possible to audit all test results due to the number involved. For example, the typical approach is to perform spot checks on some of the results, which may be an insignificant amount. Furthermore, there may be errors or empty data which could be corrected.

There is, therefore, a need to automate the test acceptance process by automatically comparing the test results file to specific requirements as well as autocorrecting results, tracking test personnel performance, and the like.

BRIEF SUMMARY OF THE DISCLOSURE

There is therefore provided a system and a method to automate the validation process. With this automation, audit personnel will spend less time accepting and verifying test result files from the sub-contractors. Once the results have been accepted and validated with a tool, a digital "stamp of approval" may be placed in the measurement file, providing authentication. It will, therefore, be possible to quickly see if a specific test results file has been audited or not. Advantageously, the systems and methods provide error-checking, auto correction of some errors, and a collaborative environment for testing between different parties (e.g., a communication services provider who owns/operates a network, a managed services company who builds the network, and a subcontractor who performs testing of the network).

In an embodiment, a network testing system includes one or more test devices each including a media-specific testing module and a processing device with a network interface, wherein the processing device is configured to test a network with the media-specific testing module; one or more servers configured to receive test results from the test of the network either directly from the one or more test devices or an intermediate data source communicatively coupled to the one or more test devices; and a validator module executed on the one or more servers configured to perform automated post-processing on the test results to compare the test results to a pre-defined Method of Procedure (MOP), to auto-correct one or more errors in the test results, and to provide a report based on the comparison. The test can be performed by a contractor on the network owned by a customer who defines the MOP, and the test results are provided by the contractor to the customer subsequent to the post-processing and the auto-correct by the validator module.

The test can be performed by a contractor on the network owned by a customer which defines the MOP and the test results are provided by the contractor to the customer subsequent to the post-processing and the auto-correct by the validator module. The customer can have a pool of licenses and utilize a plurality of contractors for testing the network, and wherein the contractor utilizes a license from the pool of licenses during the test and the licenses is reassigned back to the pool of licenses after the contractor is complete. The network testing system can further include a mobile device executing an application and communicatively coupled to the one or more test devices, wherein the mobile device is configured to buffer the test results from the one or more test devices when connectivity is unavailable for the one or more test devices. The one or more servers, subsequent to the automated post-processing, can be configured to provide a notification to corresponding test personnel performing the test with issues such that the test personnel addresses the issues while on site.

The notification can be provided to both a corresponding test device and a mobile device associated with the test personnel. The issues can include threshold crossings indicative of poor tests and the notification includes remedial actions to address the threshold crossing prior to a retest. The one or more errors in the test results can be related to the identification of parties or location, identifiers of items in the network, and test parameters. The one or more errors can be related to one or more of test thresholds and test settings, wherein incorrect test thresholds are corrected and the test results are analyzed by the validator module for any threshold crossings based on the corrected test thresholds, and wherein incorrect test settings are corrected in the one or more test devices for rerunning the test.

In another embodiment, a validation system includes a network interface communicatively coupled to one or more test devices each comprising a media-specific testing module and a processing device, to test a network with the media-specific testing module; a processor communicatively coupled to the network interface; and memory storing instructions that, when executed, cause the processor to obtain test results, via the network interface, from the one or more test devices from the test of the network, execute a validator module for automated post-processing on the test results to compare the test results to a pre-defined Method of Procedure (MOP), and to auto-correct one or more errors in the test results, and provide a report based on an output of the validator module for the test results.

The test can be performed by a contractor on the network owned by a customer which defines the MOP and the test results are provided by the contractor to the customer subsequent to the post-processing and the auto-correct by the validator module. The network interface can be further communicatively coupled a mobile device associated with a user performing the test, wherein the mobile device executes an application and is communicatively coupled to the one or more test devices, and wherein the mobile device is configured to buffer the test results from the one or more test devices when connectivity is unavailable for the one or more test devices. The memory storing instructions that, when executed, can further cause the processor to, subsequent to the automated post-processing, provide a notification to corresponding test personnel performing the test with issues such that the test personnel address the issues while on site. The notification can be provided to both a corresponding test device and a mobile device associated with the test personnel. The issues can include threshold crossings indicative of poor tests and the notification includes remedial actions to address the threshold crossing prior to a retest. The one or more errors in the test results can be related to the identification of parties or location, identifiers of items in the network, and test parameters.

In a further embodiment, a network testing method includes, in a processing device having a network interface communicatively coupled to one or more test devices each comprising a media-specific testing module and a processing device, to test a network with the media-specific testing module, obtaining test results, via the network interface, from the one or more test devices from the test of the network; executing a validator module for automated post-processing on the test results to compare the test results to a pre-defined Method of Procedure (MOP), and to auto-correct one or more errors in the test results; and providing a report based on an output of the validator module for the test results.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 illustrates a screenshot of an example validation report;

DETAILED DESCRIPTION OF THE DISCLOSURE

In various embodiments, the present disclosure relates to systems and methods for validation of test results in network testing of a network. Variously, aspects of the systems and methods include test result validation, auto-correction of errors in test results, and/or collaboration between different entities (e.g., service providers, subcontractors, etc.). The validation aspects include automatically determining if tests were properly performed to pre-defined criteria. This is especially useful where third parties perform tests for end customers and where the validation can be provided before a technician leaves a site. The auto-correction of errors enables corrections of some tests results such as typos, locations, identifiers, results, etc. The collaboration enables disparate entities, e.g., service providers, managed services companies, and subcontractors, to work together in an integrated, unified manner.

In an embodiment, a validation module is hosted in the cloud and an application (e.g., EXFO's FastReporter3™ or EXFO Connect™) communicates with the validation module (e.g., via an Application Programming Interface (API)) in order to validate test results as per a specific MOP defined by a customer (network operator). Advantageously, the systems and methods provide error-checking, auto correction of some errors, and a collaborative environment for testing between different parties (e.g., a communication services provider who owns/operates a network, a managed services company who builds the network, and a subcontractor who performs testing of the network).

The systems and methods advantageously streamline and process test results in real-time to ensure an on-site tester has properly carried out associated tests, i.e., from the MOP defined by the customer. Thus, the on-site tester can leave a site knowing all testing work is complete and valid. If not, the test result validation allows the on-site tester to re-test properly, correcting specific identified deficiencies/errors. This avoids subsequent site visits, reducing cost, time, and speeding network availability. Further, the collaborative aspects enable third-party testers to work as if they were under the direct control of the customer (network operator).

The systems and methods include field test automation and analytics that efficiently and accurately orchestrate the flow of information throughout critical testing phases during network deployments, such as, without limitation, fiber access and data center networks such as Fiber-to-the-Home (FTTH), Fiber-to-the-Node (FTTN), Fiber-to-the-Distribution-Point (FTTdp), Fiber-to-the-Antenna (FTTA), and Distributed Antenna Systems (DAS). The field test process automation provides process control and test automation to reduce testing cycles, optimize field performance, and speed up network in-service. The systems and methods provide a collaborative ecosystem that facilitates secure job data and results transfer in a high performance and availability environment to save time and eliminate errors. The contextual analytics deliver process visibility through actionable data to guarantee on-time and within budget network deployments.

The results validation automates the audit of a massive number of results, in real-time, effectively ensuring compliance with the test process and network design thresholds. For example, the validation can be in real-time while testing personnel is still on-site. Accordingly, any errors can be rectified without new truck rolls (i.e., having to reschedule/resend personnel out to test).

Figure 1:
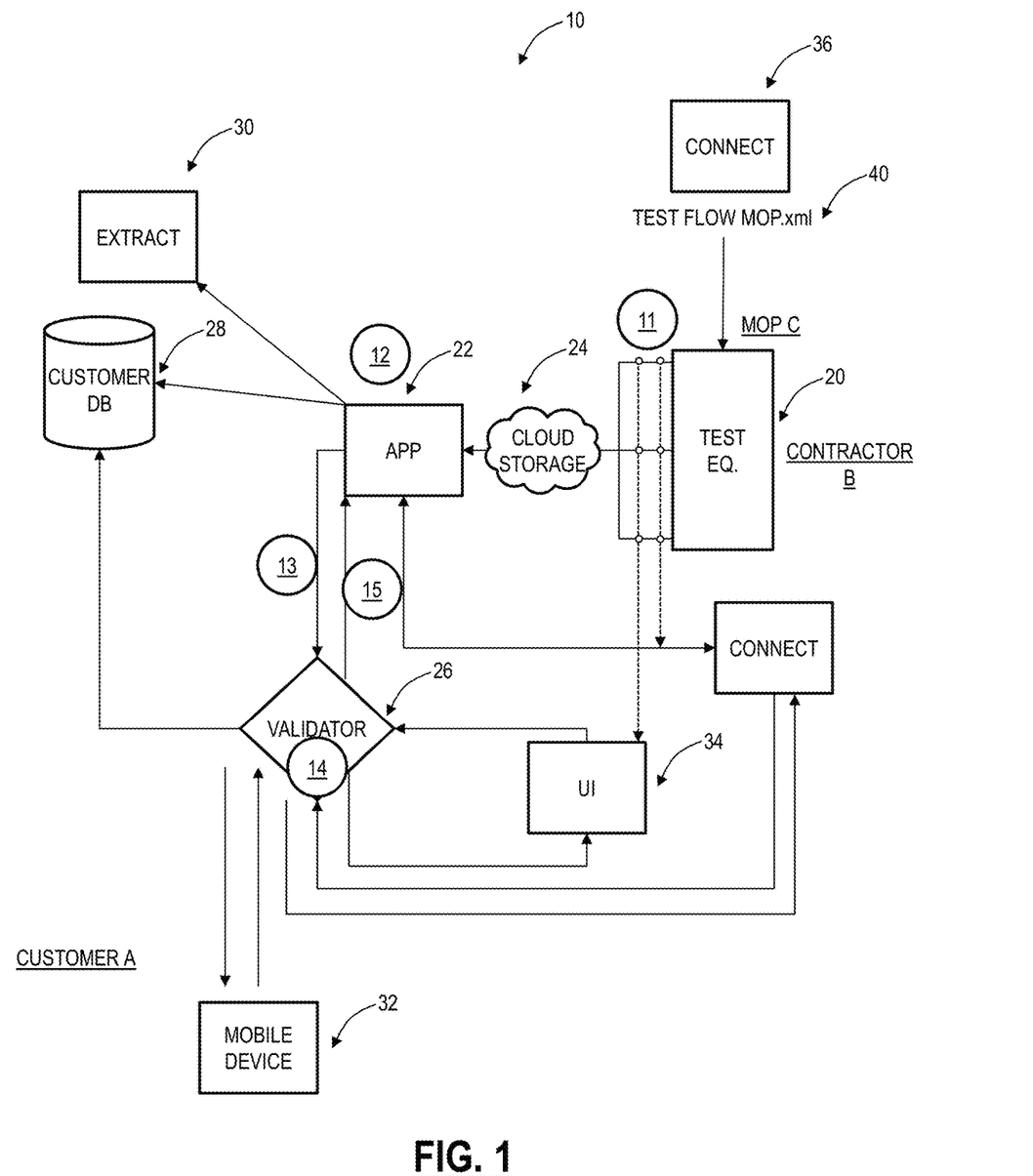
FIG. 1 illustrates an exemplary system and method for validating test results in accordance with a given Method of Procedure (MOP)
Figure 2:
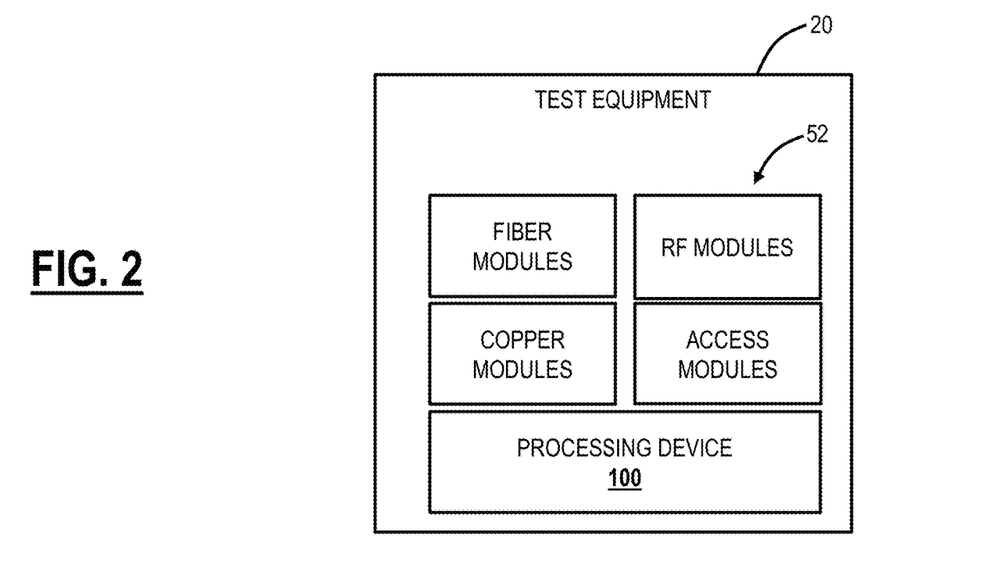
FIG. 2 illustrates a block diagram of test equipment for performing testing in the system.
Figure 3:
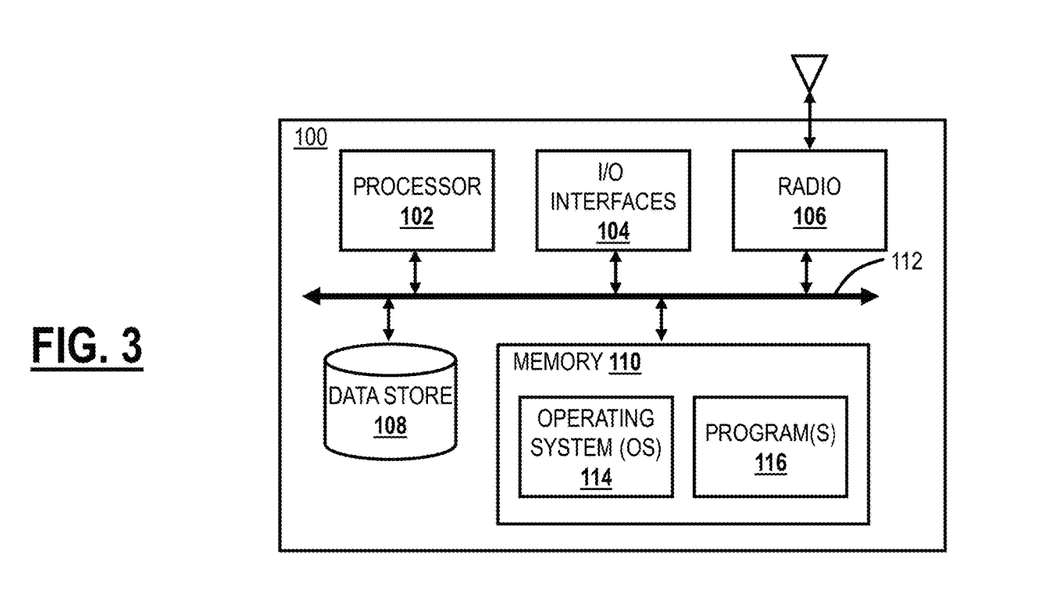
FIG. 3 illustrates a block diagram of a computing device for executing a validation module, the third-party validation application, for inclusion in the test equipment.

FIG. 1 illustrates an exemplary system 10 and method for validating test results in accordance with a given Method of Procedure (MOP). FIG. 2 illustrates a block diagram of test equipment 20 for performing testing in the system 10. FIG. 3 illustrates a block diagram of a processing device 100 for executing the validation module, the validation application, for inclusion in the test equipment 20, etc. Of note, the processing device 100 can be integrated into the test equipment 20, can be a stand-alone server, can be a mobile device, etc.

In FIG. 1, for illustration purposes only, the tests/measurements are performed by contractor B, for customer A and as per the MOP C document for describing collaboration aspects. An example of one of the possible use case is described with reference to FIG. 1 in steps 11-15. As described herein, the customer A can be a network operator of a network, the contractor B can be a third-party who performs testing of the network for the customer A, and the customer A can define the MOP C which specifies various aspects of the testing and reporting.

As shown in FIG. 1, tests/measurements are performed by contractor B using test equipment 20 and are transferred to an application 22 (e.g., FastReporter3™ from EXFO in this example), such as via cloud storage 24 (step 11). The test equipment 20 is described in FIG. 2 and can include a network interface which uploads test results to the cloud storage 24 and/or application 22. Note, the tests/measurements should have been acquired/performed using specific requirements described in the MOP C of customer A.

Next, the test/measurement results are verified against the requirements described in the MOP C document by the application 22 (step 12). Traditionally, this verification step is manual, offline, error-prone, and slow. Using the tools present in the application 22 (e.g., FastReporter3™ software), contractor B may manually/automatically verify the test results. The application 22 is configured to automate this verification process. Note that, at this point, the test results file is tagged as non-validated.

From the application 22 (e.g., FastReporter3™), the contractor B selects a test results file to be validated and the MOP document according to which the test results should be validated (MOP C in the current example) and then sends a request to a validator module 26 (such as a validation module) to initiate the validation (step 13).

The validator module 26 may verify that the contractor B can perform such validation (that he has the rights to call the service) and that the customer A has paid the necessary fees to have its MOP C hosted in the validator module 26 (step 14). Once these two verifications are performed, the validator module 26 compares the test results to the requirements present in the MOP C document, and it validates whether all the measurements have been performed and whether they comply with the requirements (i.e., whether the measurements are in conformance with the MOP C).

For test results files in compliance with the requirements present in the MOP C document, a digital stamp/signature (a "pass" stamp) is placed in the test results file that has been audited by the validator module 26. For those test results files that fail the validation, a "fail" stamp may be placed in the test results file. The stamp is a digitally-authenticated stamp that cannot be modified by anyone, except the issuer. The stamp can be embedded in a file of the test results certifying the results are validated. This can be included with various vendor-specific file types as well as open file types such as PDF. Optical Time Domain Reflectometer (OTDR) data is provided in a standardized file format known as a Standard OTDR Record (SOR) file. This format is defined in Telcordia SR-4731, issue 2. It is not possible to change the SOR file standard, but the digital stamp can be included in the vendor specific area of the SOR file, such as the special proprietary block. Thus, the inclusion of the digital stamp does not impact the SOR file.

Further, the on-site tester can be immediately notified of any failure or issue. By immediately, this means on the order of several minutes so as to connect with the on-site tester before leaving the site. Also, the notification can be through multiple mechanisms including, for example, via the test equipment 20, via an email, via a text message, etc. The multiple mechanisms are important as the on-site tester may turn off the test equipment 20 after the tests, so any notification directly to the test equipment 20 may not be received. In this case, the on-site tester (technician) would receive the text or email with the test equipment 20 off while still on-site.

The test results file is returned to the customer A (step 15), such as via the application 22 and communication to a customer database 28 or an extract module 30. Of note, the various modules such as the application 22, the validator module 26, the extract module 30, etc. can be implemented as separate modules, integrated modules, etc.

A summary of the validation is also returned to the contractor B. In this summary, the contractor B finds information about the results that have passed the requirements and also the ones, if any, that failed the requirements. For those test results files that fail the validation, the contractor B is notified of which parameters or aspects of the tests have failed the requirements. With this information in hand, the contractor B can know exactly the actions to be taken in order to correct the situation and get a "pass" stamp.

For test results files in compliance with all the requirements, a report document is generated by the validator module and returned to contractor B. This report is based on the report template present in the MOP C requirements.

The embodiments described above are intended to be exemplary only. It will be readily understood that the request for validation may come from several applications or a single, integrated application. For example, the request could come directly from a test unit (test equipment 20), from a customer database 28, from a mobile device 32, from a web-based application (User Interface (UI) 34), from a cloud-based testing system (connect 36), etc. Again, the various architecture described herein is described for illustration purposes. Various arrangements of the functional modules are contemplated.

The validator module 26 includes a rule-based engine which can evaluate test results, reference data associated with a job, the configuration of the test equipment 20, and a MOP 40. The validator module 26 can be a third-party validation module that validates the results before they are sent to the customer. The reference data can be data that is not necessarily originated by the test equipment 20 or represented in the test results. An example of reference data can include a civic address reverse geocoding which is based on the latitude/longitude coordinates captured during the testing process. The rules can include comparing the validation to text in the civic address (e.g., city). This reference data may be present in the original job definition or retrieved as-needed when results are returned from the test equipment (when the data is too large to provide per-job to the test equipment).

The validation module 26 automates the acceptance process by automatically comparing the test results file to specific requirements. Bad results, not complying with the requirements, are rejected/flagged. Depending on the business rules, there may be items which are flagged but which do not result in the results being rejected.

Once the results have been accepted and validated with the tool, a digital "stamp of approval" can be placed in the measurement file, allowing quick determination of whether a specific test results file was audited or not. As there could be multiple entities (companies, contractors, etc.) involved, there could also be multiple validations when in inter-account collaboration. In this case, each validation stamp has special meaning only from the entity providing the results. For example, with a service provider customer A defining a job for managed services company B, who uses prime contractor C for performing field testing, who in turn subcontracts the work to subcontractor D; prime contractor C could validate the results from subcontractor D according to their requirements (which could be the same, a subset of, or different to the requirements of A and B). The validation stamp may be used as internal proof of work done, or to managed services company B if they do not perform their own validation. Managed services company B may perform their own validation and stamp to provide proof internally or to their customer A, again depending on if customer A does their own validation.

A key aspect is the systems and methods do not require any entity to be 'licensed.' Licensing dictates how information may be passed from one entity to another and whether any entity can perform validation on the results themselves. In the conventional model of testing and associated software platforms, each user has to be licensed. So, in this example, service provider customer A, managed services company B, prime contractor C, and subcontractor D each would have their own licenses in a conventional deployment. With the inter-account collaboration described herein, this conventional approach would be difficult as the service provider customer A may deal with tens or hundreds or even thousands of different entities.

Figure 6:
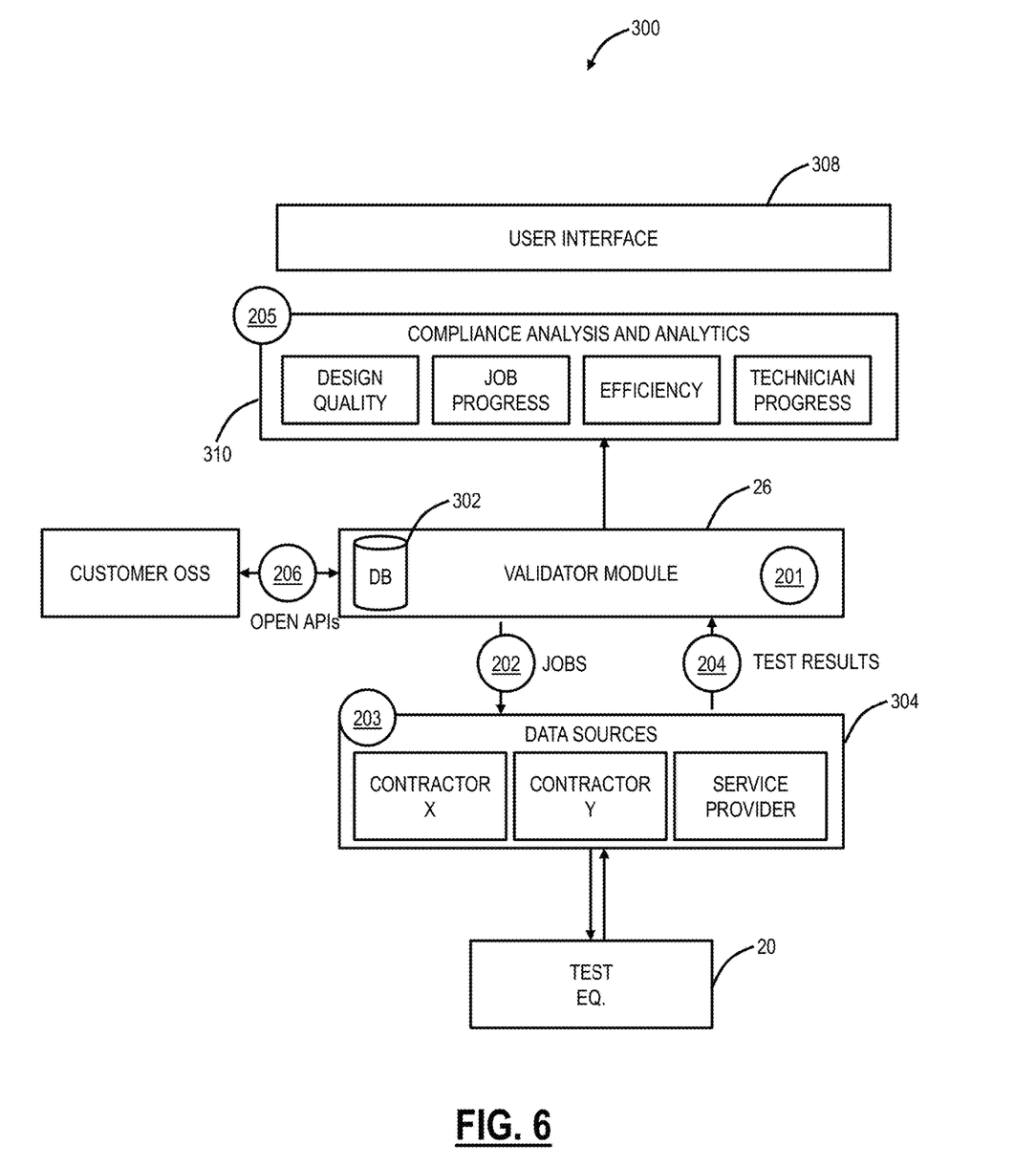
FIG. 6 illustrates a block diagram of a system for implementing the validation method of FIG. 5.

In the system 10 and the system 300 described in FIG. 6, a new licensing model can be used better suited to the collaboration. Here, the service provider customer A can have a pool of licenses which are not user-specific, but which are taken by current users and then given up when tests are complete (e.g., at the end of the validation or when the digital stamp is provided). This pool model can work in any direction as well, e.g., the managed services company B can have a pool for prime contractors, subcontractors, etc. or the subcontractor D can have a pool for working with different service provider customers, etc.

In an embodiment, any third-party testers (contractors) have to use the validator module 26 prior to submitting results to the customer. The validator module 26 can have instructions or steps which define the MOP 40. Further, the customer can have the ability to change/update/edit/create different validation engines for different test equipment 20, for different contractors, etc. This is one example when the customer defines the validation rules, but the subcontractor performs the validation.

FIG. 2 illustrates the test equipment 20. The test equipment 20 can include different physical media test modules 52, e.g., fiber, Radio Frequency (RF), copper, access, etc. These may be replaceable as needed, such as via a slot in a housing associated with the test equipment 20. The physical media test modules 52 include ports and connectors to interface to networks for testing. The test equipment 20 can further include a processing device 100, which is described in FIG. 3 for further details. In an example application, the test equipment 20 can be an OTDR that characterizes optical fiber via injecting an optical signal (e.g., optical pulses) and measuring a corresponding received back-scatter signal to detect, e.g., poor splices, fiber issues, attenuation, distance, etc. Other types of test devices are also contemplated. For example, an RF module could support 3G, Long Term Evolution (LTE)/4G, 5G, Wi-Fi, etc. A copper/access module could measure performance for copper lines, Digital Subscriber Loop (DSL), etc. Other test modules can test network applications such as Voice over Internet Protocol (VoIP), etc.

In FIG. 3, the processing device 100 can be a digital device that, in terms of hardware architecture, generally includes a processor 102, input/output (I/O) interfaces 104, a radio 106, a data store 108, and memory 110. It should be appreciated by those of ordinary skill in the art that FIG. 3 depicts the processing device 100 in an oversimplified manner, and a practical embodiment may include additional components and suitably configured processing logic to support known or conventional operating features that are not described in detail herein. The processing device 100 can be incorporated in the test equipment 20. Also, the processing device 100 can be a stand-alone server, group of servers, etc. for executing the validation module, the validation application, etc.

The components (102, 104, 106, 108, and 102) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the processing device 100, a semiconductor-based microprocessor (in the form of a microchip or chip set), or generally any device for executing software instructions. When the processing device 100 is in operation, the processor 102 is configured to execute software stored within the memory 110, to communicate data to and from the memory 110, and to generally control operations of the processing device 100 pursuant to the software instructions. In an exemplary embodiment, the processor 102 may include a mobile-optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the processing device 100.

The radio 106 enables wireless communication to an external access device or network. Any number of suitable wireless data communication protocols, techniques, or methodologies can be supported by the radio 106. The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 can include one or more software programs, each of which includes an ordered listing of executable instructions for implementing logical functions. In the example of FIG. 3, the software in the memory 110 includes a suitable operating system (O/S) 114 and programs 116. The operating system 114 essentially controls the execution of other computer programs and provides scheduling, input-output control, file and data management, memory management, and communication control and related services. The programs 116 may include various applications, add-ons, etc. configured to provide end-user functionality with the processing device 100.

The mobile device 32 can have a similar architecture as the processing device 100. In an embodiment, the mobile device 32 can execute an application which communicates with the test equipment 20. The mobile device 32 can communicate with the test equipment 20 via Bluetooth, Wi-Fi, wired Ethernet, USB, via combinations, or the like. The mobile device 32 is configured to communicate to the Internet (and the cloud storage 24, the validator 26, etc.) via cellular, Wi-Fi, etc. The test equipment 20, once on site, can communicate to the Internet (and the cloud storage 24, the validator 26, etc.) via Wi-Fi, wired Ethernet, etc.

In an embodiment, assume there is no network connectivity at a test location (e.g., because the site is new and not operative yet, the site is remote, the site is an outside plant, there is poor wireless coverage or any other reason). The mobile device 32 can buffer data from the test equipment 20 at the test location, via the application and the communication between the mobile device 32 and the test equipment 20. For example, the mobile device 32 can store all the test results that the test equipment 20 has. Of note, once testing is complete, the test equipment 20 is typically turned off After the technician leaves the test location, the mobile device 32 is likely to quickly regain network access, such as via cellular, etc. At this point, the mobile device 32 can transmit the test results to the cloud storage 24, the validator 26, or the like. This buffering approach reduces the time to get the test results in the cloud, enabling quicker validation, etc., i.e., the process can continue without waiting for the technician to get back in the office.

FIG. 4 illustrates a screenshot of an example validation report which is an output of the validator module 26. In this example, the test equipment 20 is a fiber test module, such as an OTDR which characterizes optical fiber. The validation report is presented in a tabular format (other formats are contemplated) and lists items with issues, type (just OTDR in this example), failed topic (a category of the failure), a parameter, and a current value versus an expected value. The current value versus an expected value can be a comparison of string values (e.g., "Service Provider X" vs. empty) or numeric values (e.g., missing "-" vs. any value). The current value versus an expected value can also be a threshold comparison (e.g., 0.833 dB vs.≤0.700 dB). These are two example categories of rules. Other rules are also contemplated.

Again, FIG. 4 illustrates an OTDR test. The table includes example columns listing the items with issues, type (OTDR in this example), a failed topic, a parameter further characterizing the failed topic, a current value (which is incorrect), and an expected value. The items with issues columns provide the user with a point of reference, e.g., a test name, etc. For example, various rows labeled CHE35 . . . correspond to individual tests where rows Project correspond to an overall series of tests. In this example, the rows for Project indicate there were supposed to be 99 tests (e.g., in the MOP), but the results only are for 95 tests, i.e., current value vs. expected value. Further, the rows for Project indicate the missing tests, e.g., by number. Note, these examples cannot be auto-corrected as the test information is simply unavailable. Test personnel would utilize these notifications to go back and perform the missing tests while still on-site.

The failed topic can be a category such as identification (i.e., labeling), identifier (e.g., something in the MOP like a test that was not performed), Pass/Fail (P/F) thresholds verdict (i.e., a result that is below a predetermined threshold), and test parameters (i.e., another result that is below a predetermined threshold).

For the comparison of string values or numeric values, the validator module 26 is checking to make sure entries are proper or filled in at all. For the comparison to a threshold, the validator module 26 is checking to make sure configuration settings were properly set or that the results are in-line with expectations. The automated post-processing allows to correct typos in the documentation of the test and allows the technician to carry out the test more quickly, using the proper test settings and conditions.

In an embodiment, a network testing system includes one or more test devices each including a media-specific testing module and a processing device with a network interface, wherein the processing device is configured to test a network with the media-specific testing module; one or more servers configured to receive test results from the test of the network either directly from the one or more test devices or an intermediate data source communicatively coupled to the one or more test devices; and a validator module executed on the one or more servers configured to perform automated post-processing on the test results to compare the test results to a pre-defined MOP, to auto-correct one or more errors in the test results, and to provide a report based on the comparison. The test can be performed by a contractor on the network owned by a customer who defines the MOP, and the test results are provided by the contractor to the customer subsequent to the post-processing and the auto-correct by the validator module.

The auto-correct of the test results can occur after a first validation by the validator module 26. The correction of data following the validation depends on the type of error that was found. If it is related to the physical nature of the results (e.g., fiber length, fiber loss, etc.), it is not something that can be fixed in post-processing (automated or not). Everything related to job documentation, results interpretation (e.g., pass/fail threshold) could be corrected. The engine applies new "documentation information" over the binary files/results. For example, auto correction can include changing location data to match a test location.

The validator module 26 can also provide an error report which selects all measurements that have a validation error. In an embodiment, the testing can be an OTDR and the validator module 26 can perform validate various configurations of the OTDR test including range, launch or receive fiber lengths, pulse width, etc.

The auto correct aspect can correct data entries related to job identifier (ID), customer name, company name, etc. The auto correct aspect can also correct customer fields, file names, OTDR test parameters and settings, OTDR thresholds, and the like. For example, the failed topic in FIG. 4 of identification is indicative of wrong or empty data in a field for a specific test, compared to an expected value. In this case, the current value can be flagged, and the user presented with the expected value. The expected value can be used to auto-correct the wrong identification.

For identifiers, this can include missed tests ("missing measurements") which need to be performed. Also, the identifiers can include wrong identifiers such as where a fiber ID is listed as 100 when the MOP says the testing is over fibers 1 through 100. For test parameters, the current value can also be auto-corrected based on the expected value such as where the receive fiber length is missing (listed as 0.000 km). The P/F Event Thresholds Verdict provide listings where a test "failed." For example, connector loss or reflectance was too high, so it is desirable to address this issue (e.g., clean the connector) and retest.

Records can be kept tracking the history of the tests. For example, how many times the technician carried out the test before receiving a Pass result, what were the other results, etc. Such information is useful for training, etc. An XML file can contain example validation parameters. This template has been generated using FastReporter3™ (from EXFO). This is the type of validation template that could be "attached" to a job. Currently, FastReporter3™ looks at the template and compares it to the results for which the user wants to do the validation. FastReporter3™ will return a report of the type provided. With Global Positioning Satellite (GPS) tagging, it would be possible to locate which component the technician is testing. Otherwise, the fiber lens distance can help determine the ID of the fiber under test for validation.

Also, with respect to a pass/fail analysis, the technician may alter the applied thresholds or change the test configuration (e.g., manually altering values or selecting a different test config/standard). It is important to determine if the test config/threshold set changed between tests or was the same, but the technician acted to change the pass/fail outcome (e.g., clean a fiber end face).

For auto-correction, the validator module 26 can auto-correct various fields. This can be done automatically or manually where the user is presented an option for each field to accept/reject. Once complete, the validator module 26 can provide a listing of all changes. Examples for auto-correction include problems related to Job ID, Customer, Company, Operator A and B, and comment. The examples for auto-correction can also include problems related to customs ID, file naming, etc. The examples for auto-correction can further include, e.g., for OTDR, problems related to OTDR Test Parameters, problems related to OTDR Test Settings, and problems related to OTDR Thresholds.

Figure 5:
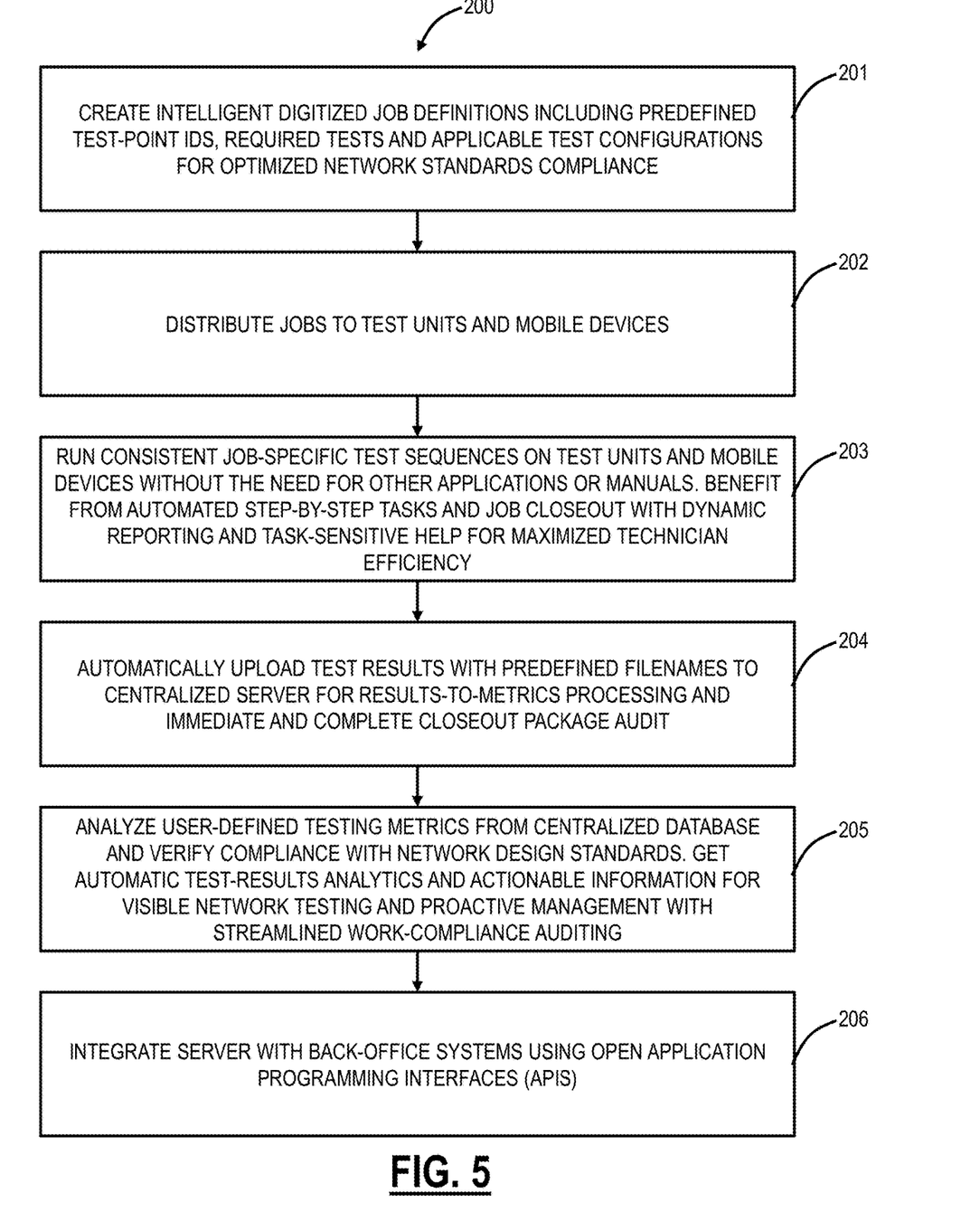
FIG. 5 illustrates a flowchart of a validation method utilizing the system of FIG. 1.

FIG. 5 illustrates a flowchart of a validation method 200 utilizing the system 10. Again, the systems and methods leverage back-office systems, web-based tools, network test equipment 20, etc. to automate and orchestrate an end-to-end testing process, between different parties. First, the method 200 includes creating intelligent digitized job definitions including predefined test-point IDs, required tests and applicable test configurations for optimized network standards compliance (step 201). The method 200 includes distributing jobs to test equipment 20 and mobile devices (step 202). On-site personnel runs consistent job-specific test sequences on test equipment 20 and mobile devices without the need for other applications or manuals, benefiting from automated step-by-step tasks and job closeout with dynamic reporting and task-sensitive help for maximized technician efficiency (step 203). The method 200 includes automatically uploading test results with predefined filenames to a centralized server for results-to-metrics processing and immediate and complete closeout package audit (step 204). The validator module 26 can analyze user-defined testing metrics from a centralized database and verify compliance with network design standards to get automatic test-results analytics and actionable information for visible network testing and proactive management with streamlined work-compliance auditing (step 205). Finally, there can be integration with the server and back-office systems using open APIs.

FIG. 6 illustrates a block diagram of a system 300 for implementing the validation method 200. Here, the steps 201-206 from the method 200 are overlaid on the system 300. The system 300 includes the validator module 26 which includes or is connected to a database 302. The test equipment 20 provides data sources 304 for the validator module 26. The data sources 304 can be physical data sources, user devices, etc. associated with the testing personnel (e.g., contractors X, Y) and the service provider (i.e., the customer, network operator, etc.). The database 302 and the validator module 26 can be connected to a customer's Operation Support System (OSS) 306 such as via APIs.

Figure 7:
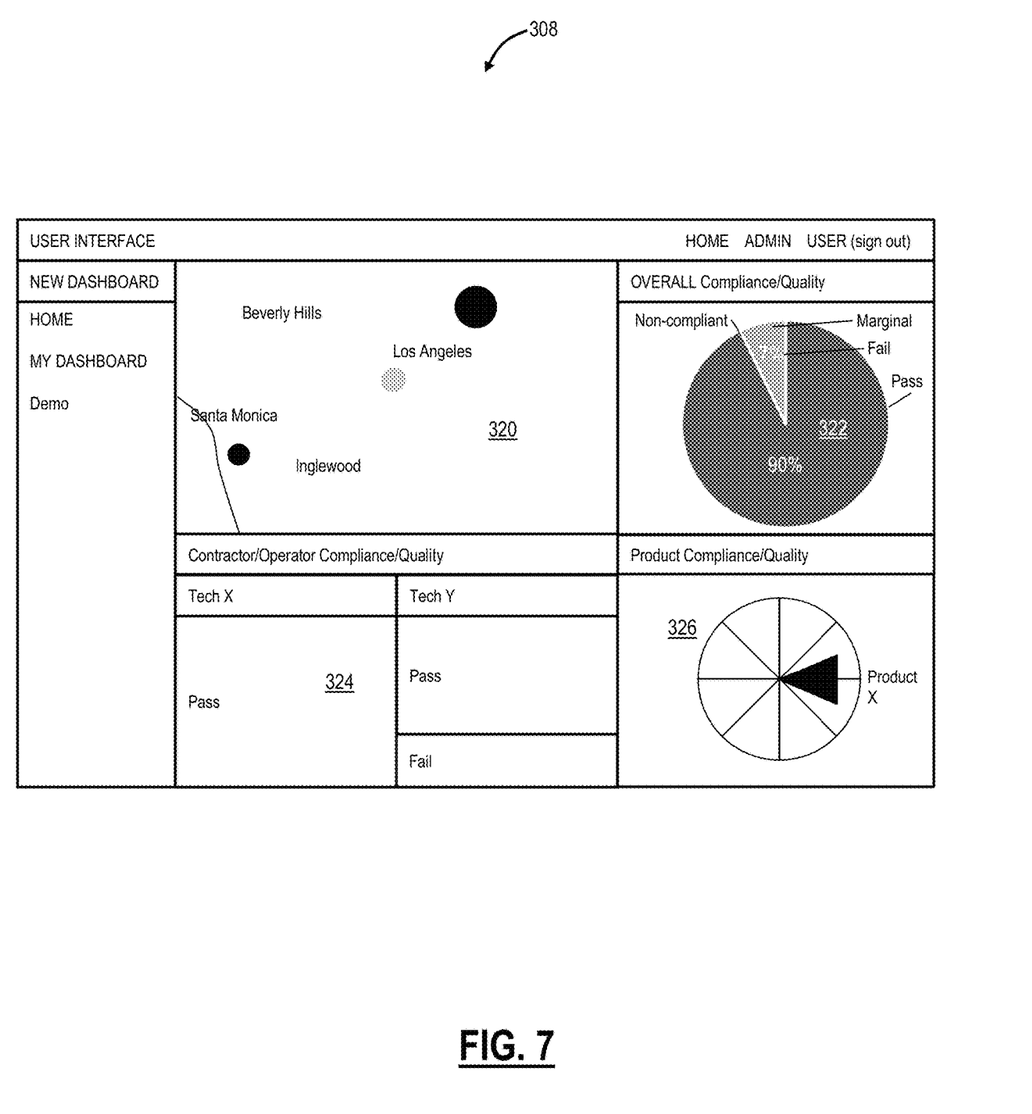
FIG. 7 illustrates a screenshot of a User Interface (UI) associated with the system of FIG. 6.

In operation (from the method 200), the validator module 26 can be interfaced by all parties via a user interface 308 which can be used to load MOPs, assign jobs, display results, etc. FIG. 7 illustrates a screenshot of a User Interface (UI) 308 associated with the system 300. The system 300 enables different reports that audit, track and trend job efficiency, quality, and status ("compliance analysis and analytics" 310).

For example, the UI 308 can be an executive dashboard view for the service provider. A map 320 can display a geographic region overlaid with visual indicators (e.g., shaded circles) indicating testing, pass/fail, etc. A pie chart 322 can display overall test results in a given time period, e.g., pass, fail, marginal. Charts 324 can present visualizations of the performance of different test personnel, contractors, groupings of test personnel, etc. Finally, a chart 326 can provide compliance/quality for given products.

All test results are easily viewable for post analysis to a specific test point by simply clicking on the item of concern—eliminating the headaches of trying to review a closeout package or verify results through an audit. Tasks and test results are objectively identified in red- or green-colored notifications and are clearly visible.

Use cases include:

Contractor efficiency—Identify which teams are more efficient. Determine which contractors close out packages quicker.

Quality—Verify quality to ensure that all tests meet performance standards. Obtain key metrics to track performance.

Compliance—Ensure that all tests and tasks are performed in accordance with established practices and thresholds—guarantee first-time-right deployments.

Project status and critical issues—Track the status of projects and see how they are performing. Find critical issues, right down to the root-cause location, with just one click. It is important to track progress such as a comparison to start/end dates for jobs/projects and a comparison to the 'burndown' (average number of tests/tasks which would need to be performed, e.g., daily to meet the target end date). Further, the projection of the actual completion date is more accurate when using actual progress.

Figure 8:
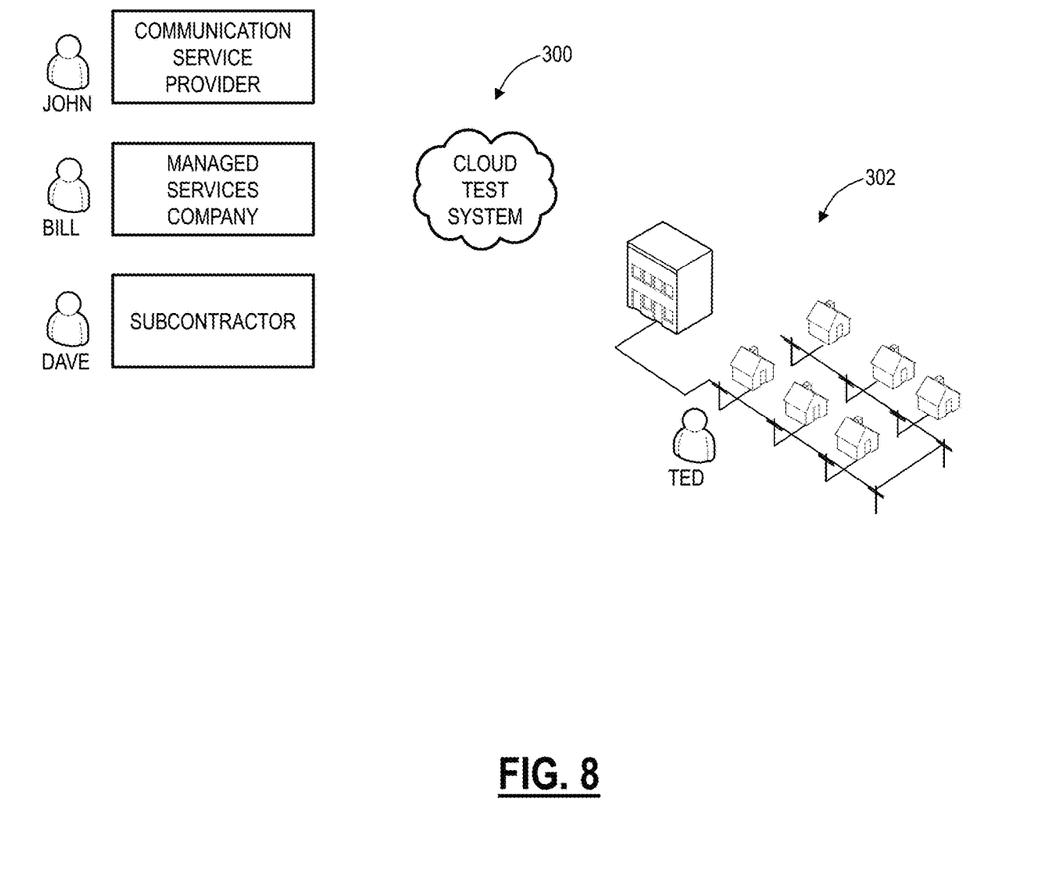
FIG. 8 illustrates inter-account collaboration between a communication service provider, a managed services company, and a testing subcontractor utilizing the system of FIG. 6 to test a network.
Figure 9:
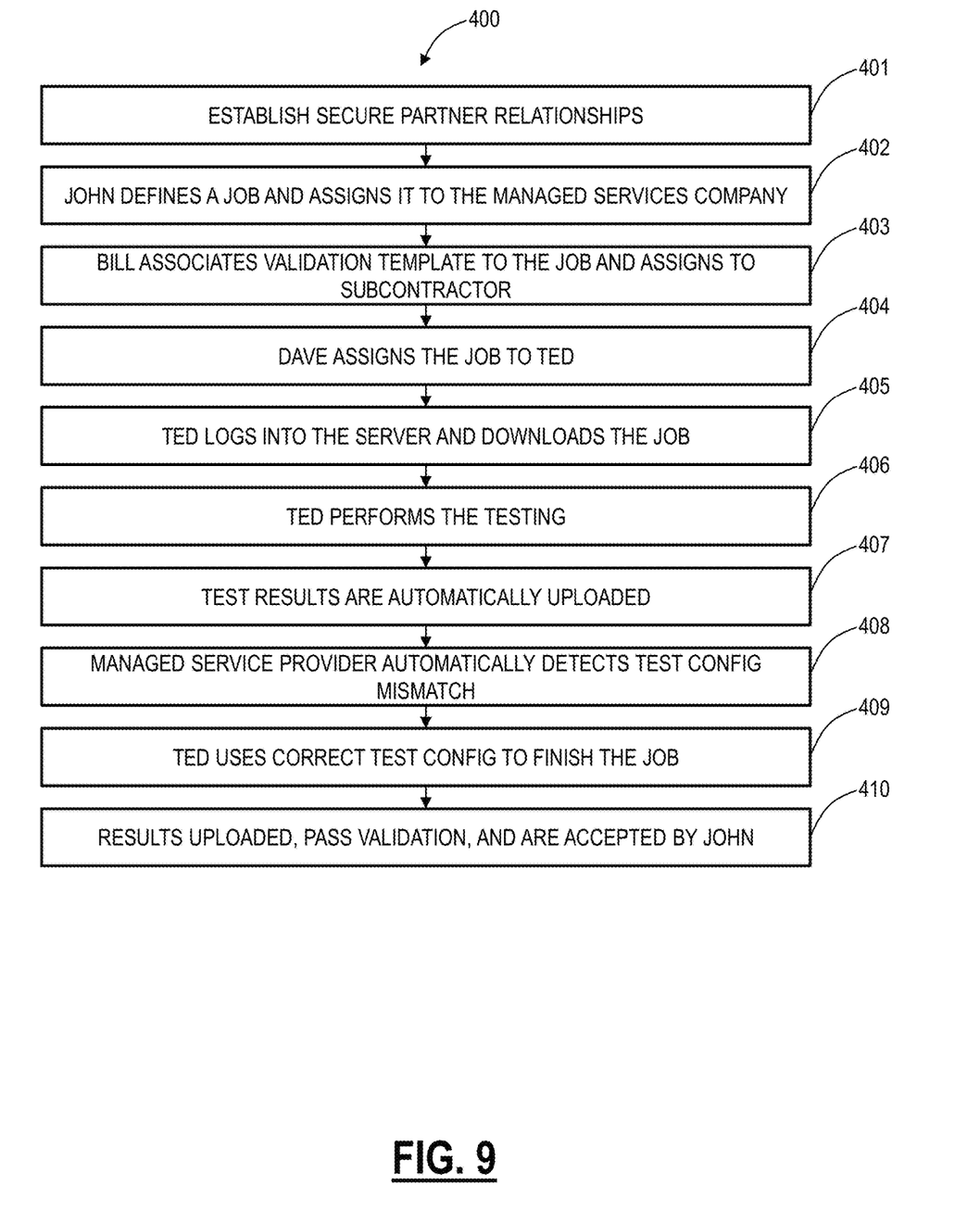
FIG. 9 illustrates a flowchart of an exemplary inter-account collaboration method.

FIGS. 8 and 9 illustrate inter-account collaboration between a communication service provider, a managed services company, and a testing subcontractor utilizing the system 300 to test a network 302. For illustration purposes, individuals are referred to herein as John for the communication service provider, Bill for the managed services company, and Dave for the subcontractor. Also, the network 302 is an FTTH application. FIG. 9 illustrates a flowchart of an exemplary inter-account collaboration method 400.

John typically deals with Bill who is a project manager at the managed services company which handles FTTH construction for the communication service provider. One of the managed services company's subcontractor is the testing subcontractor which is used for pedestal install and fiber verification testing. Bill deals with Dave who manages the field technicians for the testing subcontractor and Ted is a technician at the testing subcontractor.

Each company can operate independently with their own secure account through the system 300. The system 300 allows these companies to create and manage trust relationships with their partners to assign jobs and validate and share test results (step 401). In an exemplary operation, John can define a job and assign it to the managed services company (step 402). The job definition is through the system 300 and can include, for example, reference info, cable/fiber link IDs, tests to perform, test configurations and thresholds, special instructions, etc.

Bill can associate a validation template to the job and assign the job to the testing subcontractor (step 403). The validation template is the MOP 40 and defines how the test should be performed/expectations for the test results. This enables the auto-correction and/or retesting to correct any issues before the test results are presented back to the communication service provider.

Dave can assign the job to Ted (step 404). Note, the system 300 operates as a workflow management system and can include account separation to allow each partner/company to see what matters to them. For example, only Dave can assign jobs to his technicians and Ted can see his pending jobs.

Ted logs into the system 300 and downloads the job (step 405). The job can be downloaded to a mobile device and/or the test equipment 20.

Ted performs the test (step 406). The system 300 can be connected to the test equipment 20 and/or a mobile device during the test enabling Ted to call up contextual job instructions which detail the specific MOP for the communication service provider as well as specified custom test configurations such that Ted does not have to manually input data, e.g., test threshold values. The system 300 can provide an intuitive UI that can provide visualization of the overall job progress as well as a real-time pass/fail status of this test. This aspect is key as it removes the need for future site visits due to errors in the test. Also, all job reference and fiber link IDs can be pre-defined removing all data entry (and potential errors associated with data entry). Thus, Ted can focus on carrying out the job, not documenting along the way.

For example, assume the job specified a specific connector and fiber type, but once Ted arrived, it is determined that the actual connector and fiber type are different than what is specified in the job. Accordingly, Ted decides to use a default test configuration that more closely matches the actual connector and fiber type.

The test results are automatically uploaded (step 407). This can be performed whenever the test equipment 20 and/or a mobile device has Internet connectivity. Once uploaded, Dave can view the results uploaded by Ted. Also, the test results can be automatically transferred to the managed services providers where they can be validated against the template Bill defined.

Because Ted used a default test configuration instead of a specified one, the test results are automatically flagged as a mismatched test config, and Bill is notified (step 408). Bill can immediately call Dave to understand why Ted used a different test config and if necessary instruct Dave to inform Ted to use the correct config, while Ted is still on-site. Bill can also reject any uploaded results for this job which notifies Dave and Ted on his test set along with the rationale plus any corrective information (e.g., use the correct test config).

Ted can now use the correct test config to finish the job (step 409). For example, the correct test config may now consider the actual connector and fiber type, but not the default test configuration.

The results are uploaded, pass validation, and are accepted by John (step 410). The notifications can be automatically sent for completed jobs passing validation as well as receiving acceptance from partners.

Note, the method 400 allows for changes, in real-time, between different organizations to streamlined testing.

Figure 10:
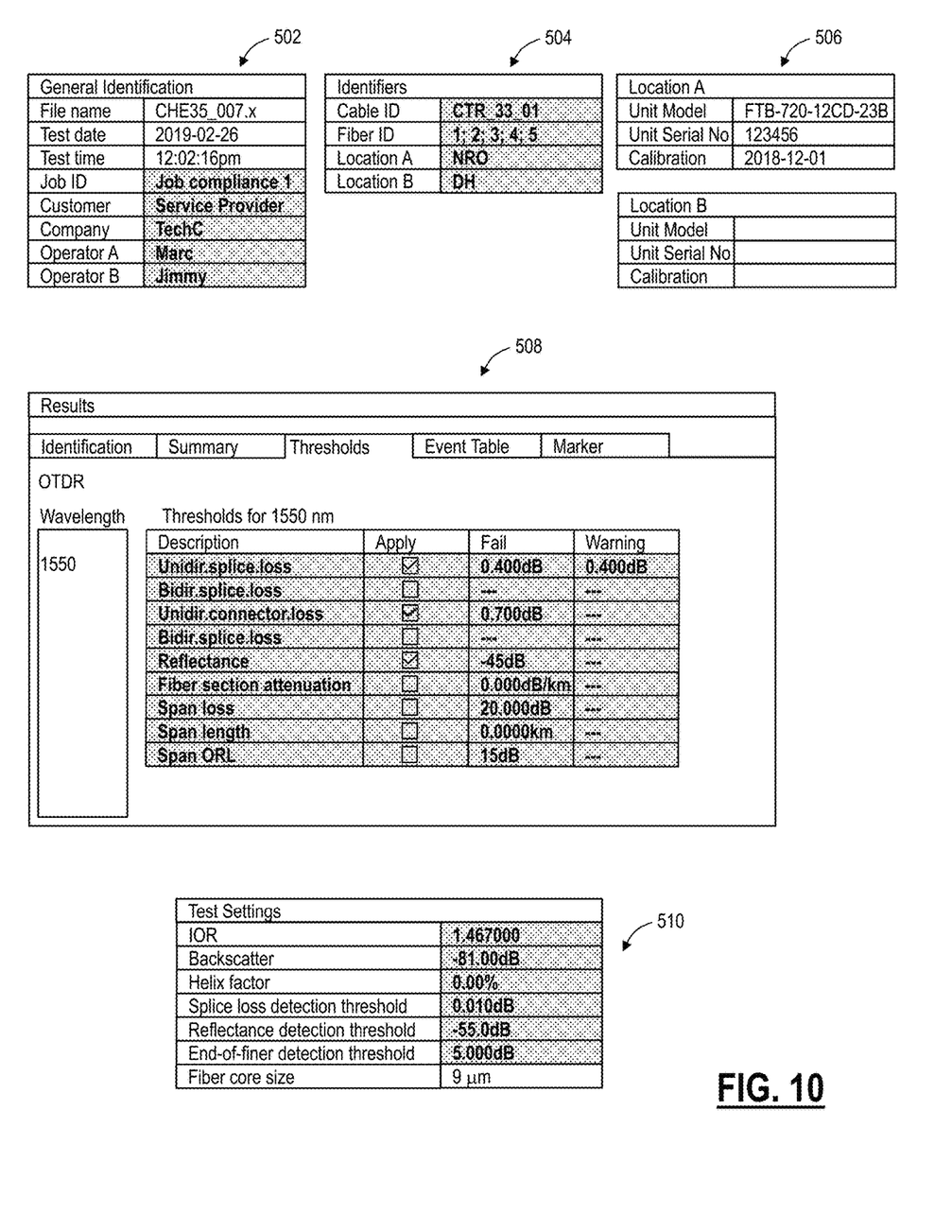
FIG. 10 illustrates a screenshot of various UIs containing data that may be auto-corrected.

FIG. 10 illustrates a screenshot of various UIs containing data that may be auto-corrected. Specifically, FIG. 11 provides examples of fields (highlighted with shading) that could be readjusted/corrected if incomplete or wrong (e.g., based on comparisons with the MOP), and of parameters that can be set by the users (e.g., thresholds and test settings). For example, a table 502 includes general identification information in the test results. Example fields that could be auto-corrected include the Job ID, customer, company, and test operators (operator A, operator B). A table 504 includes test identifiers in the test results. Example fields that could be auto-corrected include cable ID, fiber ID, and locations (location A, location B). A table 506 includes information of the test equipment 20 utilized for the test results.

A UI 506 includes a dashboard for viewing test information such as test thresholds. These may be set by the test operator in the field, pre-defined in the MOP, etc. In an embodiment, the validator module 26 may raise a flag/notification if there is a mismatch between these test threshold in the test results information and in the MOP. Note, incorrect test thresholds do not affect the test itself, but the interpretation of the test results. The validator module 26 can auto-correct the wrong test thresholds by replacing them with the correct values and reanalyze the test results for any threshold crossings.

A table 510 includes a listing of test settings such as on the test equipment 20. As with the test thresholds, these may be set by the test operator in the field, pre-defined in the MOP, etc. However, incorrect test settings may impact the test results. Here, the validator module 26 can raise a flag/notification if there is a mismatch between these test settings in the test results information and in the MOP, such that the test operator can rerun the tests with the proper test settings.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network testing system comprising:
   one or more test devices each comprising a media-specific testing module and a processing device with a network interface, wherein the processing device is configured to test a network with the media-specific testing module, wherein the test is implemented by following a pre-defined Method of Procedure (MOP) specifying testing requirements for the network and using the media-specific testing module;
   one or more servers configured to receive test results from the test of the network either directly from the one or more test devices or an intermediate data source communicatively coupled to the one or more test devices; and
   a validator module executed on any of the one or more servers and the one or more test devices, and configured to perform automated post-processing on the test results to compare the test results to the pre-defined Method of Procedure (MOP), to auto-correct one or more errors in the test results, and to provide a report based on the comparison,
   wherein the system is further configured to issue a digitally-authenticated pass stamp for the test results that are in compliance with the requirements of the pre-defined Method of Procedure (MOP).

2. The network testing system of claim 1, wherein the test is performed by a contractor on the network owned by a customer which defines the MOP and the test results are provided by the contractor to the customer subsequent to the post-processing and the auto-correct by the validator module.

3. The network testing system of claim 2, wherein the customer has a pool of licenses and utilizes a plurality of contractors for testing the network, and wherein the contractor utilizes a license from the pool of licenses during the test and the license is reassigned back to the pool of licenses after the contractor completes the test.

4. The network testing system of claim 1, further comprising:
   a mobile device executing an application and communicatively coupled to the one or more test devices, wherein the mobile device is configured to buffer the test results from the one or more test devices when connectivity is unavailable for the one or more test devices.

5. The network testing system of claim 1, wherein the one or more servers, subsequent to the automated post-processing, are configured to provide a notification to corresponding test personnel performing the test with issues such that the test personnel address the issues while on site.

6. The network testing system of claim 5, wherein the notification is provided to both a corresponding test device and a mobile device associated with the test personnel.

7. The network testing system of claim 5, wherein the issues include threshold crossings indicative of poor tests and the notification includes information regarding remedial actions to address the threshold crossing prior to a retest.

8. The network testing system of claim 1, wherein the one or more errors in the test results are related to identification of parties or location, identifiers of items in the network, and test parameters.

9. The network testing system of claim 1, wherein the one or more errors relate to one or more of test thresholds and test settings, wherein incorrect test thresholds are corrected and the test results are analyzed by the validator module for any threshold crossings based on the corrected test thresholds, and wherein incorrect test settings are corrected in the one or more test devices for rerunning the test.

10. A validation system comprising:
    a network interface that is one of i) communicatively coupled to one or more test devices each comprising a media-specific testing module and a processing device and ii) included in the one or more test devices, each of the one or more test devices is configured to test a network with the media-specific testing module, wherein the test is implemented by following a pre-defined Method of Procedure (MOP) specifying testing requirements for the network and using the media-specific testing module;

a processor communicatively coupled to the network interface; and memory storing instructions that, when executed, cause the processor to obtain test results from the one or more test devices from the test of the network, execute a validator module for automated post-processing on the test results to compare the test results to the pre-defined Method of Procedure (MOP), and to auto-correct one or more errors in the test results, and provide a report based on an output of the validator module for the test results, wherein the system is further configured to issue a digitally-authenticated pass stamp for the test results that are in compliance with the requirements of the pre-defined Method of Procedure (MOP).

11. The validation system of claim 10, wherein the test is performed by a contractor on the network owned by a customer which defines the MOP and the test results are provided by the contractor to the customer subsequent to the post-processing and the auto-correct by the validator module.

12. The validation system of claim 10, wherein the network interface is further communicatively coupled a mobile device associated with a user performing the test, wherein the mobile device executes an application and is communicatively coupled to the one or more test devices, and wherein the mobile device is configured to buffer the test results from the one or more test devices when connectivity is unavailable for the one or more test devices.

13. The validation system of claim 10, wherein the memory storing instructions that, when executed, further cause the processor to subsequent to the automated post-processing, provide a notification to corresponding test personnel performing the test with issues such that the test personnel address the issues while on site.

14. The validation system of claim 13, wherein the notification is provided to both a corresponding test device and a mobile device associated with the test personnel.

15. The validation system of claim 13, wherein the issues include threshold crossings indicative of poor tests and the notification includes information regarding remedial actions to address the threshold crossing prior to a retest.

16. The validation system of claim 10, wherein the one or more errors in the test results are related to identification of parties or location, identifiers of items in the network, and test parameters.

17. A network testing method comprising:

in a processing device having a network interface that is one of i) communicatively coupled to one or more test devices each comprising a media-specific testing module and ii) included in the one or more test devices, each of the one or more test devices is configured to test a network with the media-specific testing module, obtaining test results from the one or more test devices from the test of the network; wherein the test is implemented by following a pre-defined Method of Procedure (MOP) specifying testing requirements for the network and using the media-specific testing module;

executing a validator module for automated post-processing on the test results to compare the test results to the pre-defined Method of Procedure (MOP), and to auto-correct one or more errors in the test results; and providing a report based on an output of the validator module for the test results, wherein the method further comprises issuing a digitally-authenticated pass stamp for the test results that are in compliance with the requirements of the pre-defined Method of Procedure (MOP).

18. The network testing method of claim 17, wherein the test is performed by a contractor on the network owned by a customer which defines the MOP and the test results are provided by the contractor to the customer subsequent to the post-processing and the auto-correct by the validator module.

19. The network testing method of claim 17, further comprising: subsequent to the automated post-processing, providing a notification to corresponding test personnel performing the test with issues such that the test personnel address the issues while on site.

20. The network testing method of claim 17, wherein the one or more errors in the test results are related to identification of parties or location, identifiers of items in the network, and test parameters.

* * * * *